(12) United States Patent
Machado et al.

(10) Patent No.: US 12,071,982 B2
(45) Date of Patent: Aug. 27, 2024

(54) SEAL ASSEMBLY FOR BEARING ASSEMBLY

(71) Applicant: Schaeffler Technologies AG & Co. KG, Herzogenaurach (DE)

(72) Inventors: Elias Ferreira Machado, Sorocaba (BR); Tiago Marcelino Dias Lourenco, Sorocaba (BR); Marcelo Mariano Zavanella, Sorocaba (BR); Felipe Travaioli Souza, Sorocaba (BR)

(73) Assignee: Schaeffler Techologies AG & Co. KG, Herzogenaurach (DE)

( * ) Notice: Subject to any disclaimer, the term of this patent is extended or adjusted under 35 U.S.C. 154(b) by 197 days.

(21) Appl. No.: 17/939,368

(22) Filed: Sep. 7, 2022

(65) Prior Publication Data

US 2024/0077114 A1  Mar. 7, 2024

(51) Int. Cl.
*F16C 33/78* (2006.01)
*F16C 19/18* (2006.01)

(52) U.S. Cl.
CPC .......... *F16C 33/7823* (2013.01); *F16C 19/18* (2013.01); *F16C 33/7886* (2013.01); *F16C 33/7896* (2013.01); *F16C 2310/00* (2013.01)

(58) Field of Classification Search
CPC .. F16C 19/18; F16C 33/7823; F16C 33/7826; F16C 33/7853; F16C 33/7856; F16C 33/7886; F16C 33/7896; F16C 2310/00; F16J 15/3208; F16J 15/3216
See application file for complete search history.

(56) References Cited

U.S. PATENT DOCUMENTS 9,546,687 B2    1/2017  Kaiser et al.
2021/0190147 A1 *  6/2021  Silva ........................ F16C 19/08

FOREIGN PATENT DOCUMENTS

| CN | 108488239 A | 9/2018 | |
| DE | 10152484 A1 * | 7/2002 | .......... F16C 33/7869 |
| DE | 102010048481 A1 | 4/2012 | |
| DE | 102017129123 A1 * | 6/2019 | .............. F16C 19/08 |
| DE | 102018114509 A1 * | 12/2019 | |
| DE | 102019112825 A1 | 11/2020 | |
| DE | 102020102627 A1 | 8/2021 | |
| DE | 102020107956 A1 | 9/2021 | |
| WO | 2002048562 A2 | 8/2022 | |

* cited by examiner

*Primary Examiner* — Phillip A Johnson
(74) *Attorney, Agent, or Firm* — Volpe Koenig

(57) ABSTRACT

An improved seal assembly that includes an outer cap, a ring, and a spring washer. The ring is configured to repeatedly engage with a contact element defined on a bearing ring during rotation such that the ring vibrates.

20 Claims, 5 Drawing Sheets

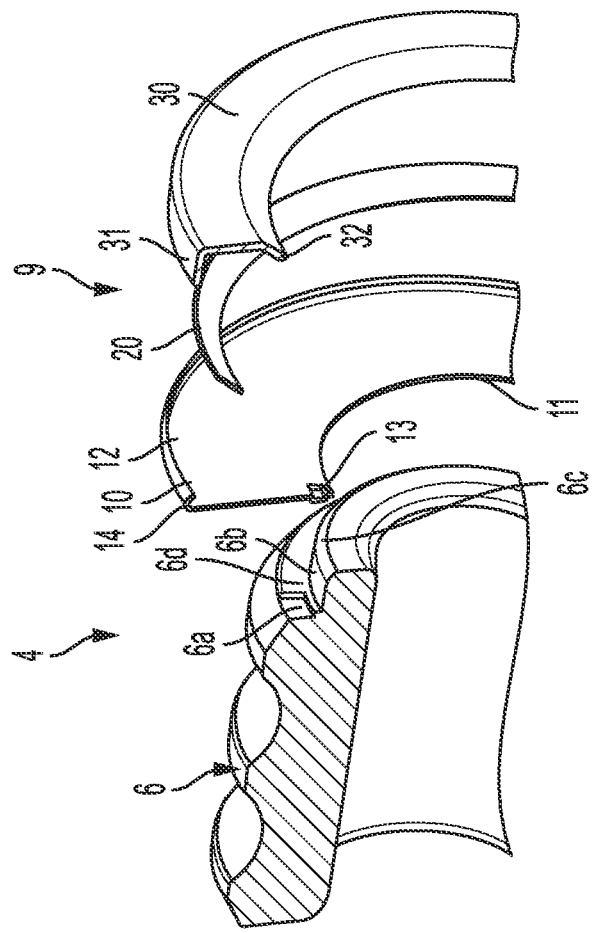
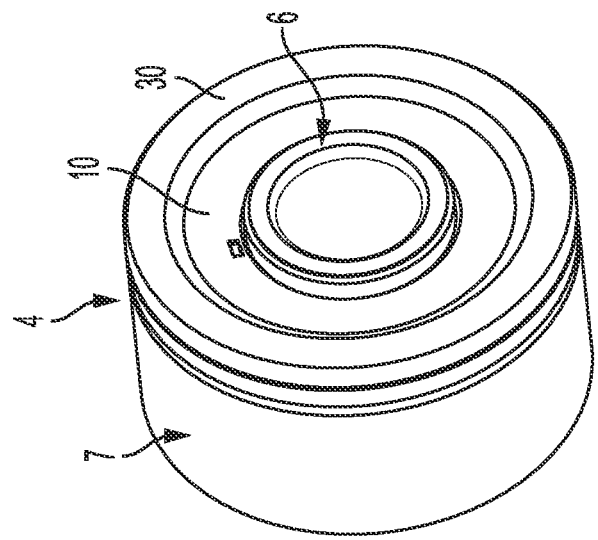
FIG. 2A
FIG. 2B

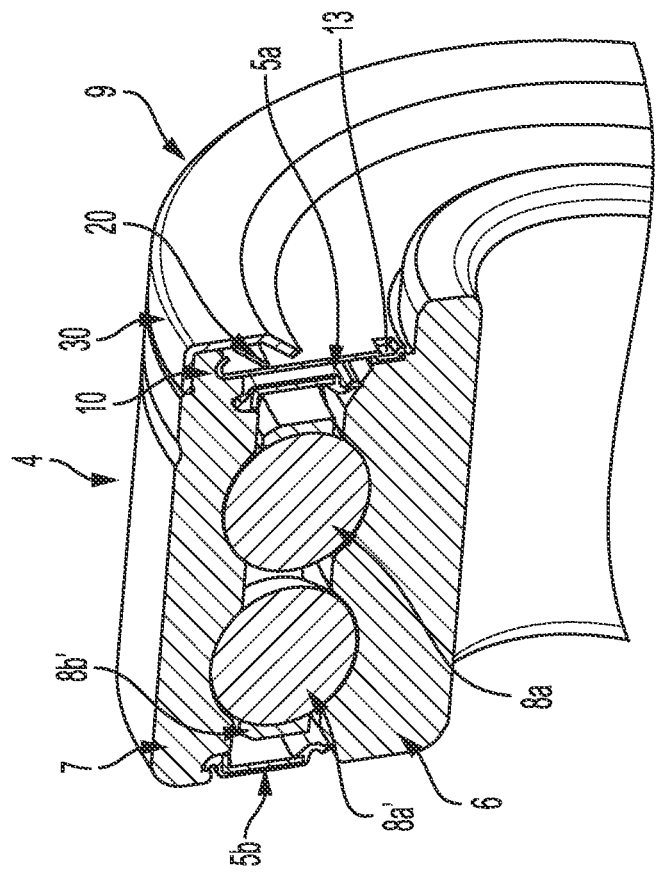
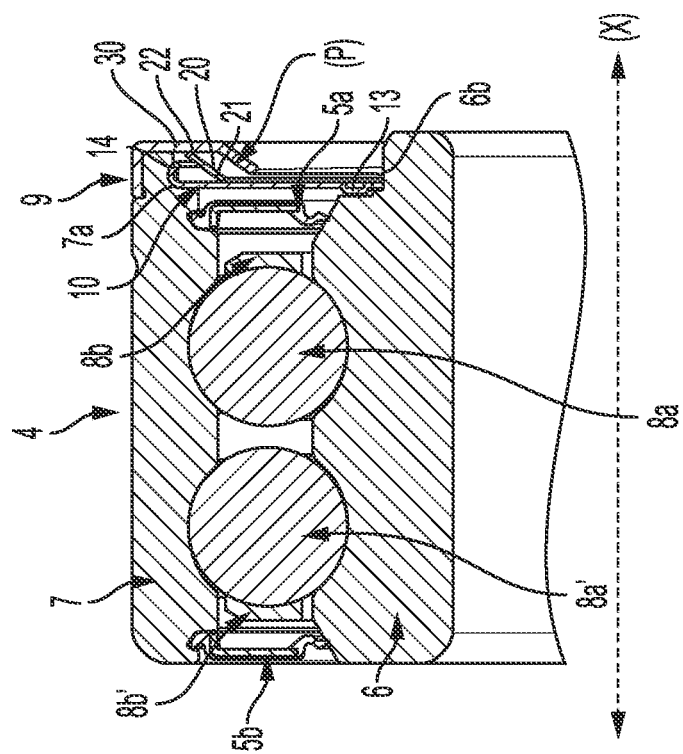

SEAL ASSEMBLY FOR BEARING ASSEMBLY

FIELD OF INVENTION

The present disclosure relates to a seal assembly and more specifically relates to a seal assembly for a bearing assembly.

BACKGROUND

Seal assemblies for bearing configurations are well known. The seal assemblies in bearing configurations are generally designed to prevent the ingress of debris to the rolling elements and raceways supporting the rolling elements to ensure proper functioning of the bearing.

It is generally known that sealing assemblies with rubber sealing lips can be used to protect bearings from debris. However, in certain situations, such as agricultural applications in which dirt and debris are more prevalent, it is desirable to provide additional sealing protection for the bearing components.

SUMMARY

A seal assembly is disclosed herein that is configured to provide additional protection for a bearing assembly. The seal assembly can include a ring having a radially inner end configured to contact an inner bearing ring and a radially outer end configured to contact an outer bearing ring. A cap is also provided that includes a first end configured to attach to an outer bearing ring. A spring washer can be arranged between the ring and the cap, and the spring washer can be configured to apply a preload force to the ring. Based on this configuration, the seal assembly will be configured to vibrate during operation, thereby promoting the removal of contamination or debris that may otherwise stick to an outer face of the seal assembly.

The cap can include a second end extending axially inwards that partially defines a retention space (P) for the spring washer. The space (P) can provide a protective space for the spring washer and protect the spring washer from contaminants.

The ring can be formed from stamped steel. The ring can also be coated with a friction reducing coating, such as graphite or polytetrafluoroethylene (PTFE).

The radially inner end or the radially outer end of the ring can have a profiled portion, such as a curved portion, that is dimensioned to be received within a groove formed on the inner bearing ring or the outer bearing ring. This curved portion and positive fit connection ensures that the ring is rotationally fixed to one of the bearing rings.

The ring can include a first contact element defined on the radially inner end or the radially outer end. The first contact element of the ring can be configured to engage with a second contact element defined on the inner bearing ring or the outer bearing ring. In this configuration, the ring is engaged with both of the bearing rings. During rotation of the inner bearing ring or the outer bearing ring, the first and second contact elements will engage with each other, thereby generating a vibrational force that will be applied to the seal assembly, thereby discharging debris from the seal assembly.

The first contact element can be formed as a protuberance on the radially inner end of the ring. The shape, profile, and form of the first contact element can vary. The first contact element can be formed as a male-type element in one example. In another example, the first contact element can be formed as a female-type element. The second contact element formed on one of the bearing rings can be formed as a recess. One of ordinary skill in the art would understand that these profiles can be reversed.

The inner bearing ring can include a shoulder and the second contact element can be formed on a radial face of the shoulder. The shoulder can have a radial and axial extent, in one configuration. The shape of the shoulder can vary.

The inner bearing ring can include an angled face instead of a shoulder having flat edges or faces. The angled face can include the second contact element.

The first end of the cap can be attached to the radially outer face of the outer bearing ring via an interference fit. Various attachment or connection arrangements can be provided between the cap and the outer bearing ring.

A first end of the spring washer can directly contact the ring and a second end of the spring washer can directly contact the cap. Based on this configuration, the spring washer can actively transmit vibrational forces, such as those experienced by the ring which is engaged against the bearing rings, to the cap. These vibrational forces promote the removal, flinging, or shaking off of contaminants.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 2A is an exploded perspective, partial cross-sectional view of a bearing assembly.

FIG. 2B is a perspective view of the bearing assembly of FIG. 2A.

FIG. 2C is a cross-sectional view of the bearing assembly of FIGS. 2A and 2B.

FIG. 2D is another perspective, partial cross-sectional view of the bearing assembly of FIGS. 2A-2C.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
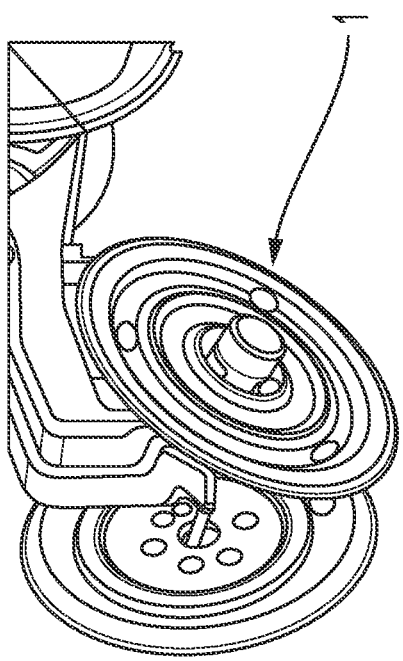
FIG. 1 is a perspective view of a wheel assembly on a vehicle.

FIG. 1 illustrates a wheel assembly 1 that can include a bearing assembly. This wheel assembly 1 can include a sealing assembly that generally can include a metallic component and an elastomeric component, which combined serve to protect the internal bearing elements (i.e. rolling elements and raceways) from debris.

As shown in FIGS. 2A-2D, an improved seal assembly 9 for a bearing assembly 4 is disclosed herein. The bearing assembly 4 can include various known bearing components, such as an inner bearing ring 6, an outer bearing ring 7, rolling elements 8a, and a cage 8b to support the rolling elements 8a. In one configuration, the bearing assembly 4 can be a two-row bearing assembly with separate rows of rolling elements 8a, 8a' and separate cages 8b, 8b'. The bearing rings 6, 7 can each define a respective raceway for the rolling elements 8a, 8a'.

In addition to the seal assembly 9, at least one additional seal assembly 5a is provided. As shown in FIGS. 2C and 2D, seal assemblies 5a, 5b can be provided immediately outward from the rolling elements 8a, 8a'. The seal assemblies 5a, 5b can include rubber sealing components, such as rubber sealing lips, and a reinforcement body. The seal assemblies 5a, 5b can generally be configured to provide at least one protective interface for the bearing assembly 4. The seal assemblies 5a, 5b can generally be configured to prevent lubricant egress, and prevent fluid (i.e. water) ingress.

The seal assembly 9 provides an additional protective interface for the bearing assembly 4 and is generally arranged axially outward from at least one of the seal assemblies 5a, 5b. In one example, the seal assembly 9 does not include a rubber sealing lip, and instead provides a rigid boundary or protective layer. Details of the seal assembly 9 are disclosed herein. One of ordinary skill in the art would understand that the seal assembly 9 could include rubber sealing lips. Additionally, the seal assembly 9 can be used without additional seal assemblies 5a, 5b.

The seal assembly 9 can include a ring 10 having a radially inner end 11 configured to contact an inner bearing ring 6 and a radially outer end 12 configured to contact an outer bearing ring 7. The ring 10 can generally be formed from stamped sheet metal, such as steel, and provides a solid barrier against contaminants from entering the interior of the bearing assembly 4. The ring 10 can be coated with a friction reducing coating, such as PTFE or graphite.

The radially inner end 11 or the radially outer end 12 of the ring 10 can have a curved portion 14, and the inner bearing ring 6 or the outer bearing ring 7 can have a groove 7a in which the curved portion 14 is secured. In one example, the curved portion 14 is arranged on the radially outer end 12 of the ring 10, and the groove 7a is formed on the outer bearing ring 7. One of ordinary skill in the art would understand that the curved portion could be formed on the radially inner end 11 of the ring 10 and the groove can be formed on the inner bearing ring 6. The ring 10 can include other profiles besides a curved portion 14, as one of ordinary skill in the art would understand based on this disclosure.

The seal assembly 9 can include a cap 30 configured to generally be retained with one of the bearing rings 6, 7. The cap 30 can include a first end 31 configured to attach to a radially outer face of an outer bearing ring 7, in one specific example. The cap 30 can be attached to the outer bearing ring 7 in other areas besides the radially outer face. The cap 30 can be attached or retained with either of the bearing rings 6, 7 in a variety of configurations. The first end 31 of the cap 30 can be attached to the radially outer face of the outer bearing ring 7 via an interference fit. The cap 30 can be formed from stamped sheet metal, in one example.

A spring washer 20 can be arranged between the ring 10 and the cap 30. The spring washer 20 can be captively secured between the ring 10 and the cap 30. One of the functions of the spring washer 20 is to apply a preload force to the ring 10, such that the ring 10 is pivoted axially inward towards the inner bearing ring 6. This configuration ensures that the ring 10 is constantly engaged with the bearing rings 6, 7. The spring washer 20 is arranged axially outward from the ring 10 such that the spring washer 20 actively drives the ring 10 axially inward. The spring washer 20 can be a Belleville spring washer, in one example.

The ring 10 can include a first contact element 13 defined on the radially inner end 11 or the radially outer end 12. The first contact element 13 of the ring 10 can be configured to engage with a second contact element 6a defined on the inner bearing ring 6 or the outer bearing ring 7. In one example, the first contact element 13 is formed as a protuberance, tab, bump, etc., on the radially inner end 11 of the ring 10. The first contact element 13 (i.e. protuberance) can be configured to cycle or reciprocate in and out of the second contact element 6a (i.e. recess) thereby promoting vibrations. In one example, more than one of the first contact elements 13 can be provided, and more than one of the second contact elements 6a can be provided. The multiple contact elements can be spaced apart from each other in a circumferential direction. The second contact element 6a can be formed as a recess, pocket, indentation, etc., on the inner bearing ring 6. The recess defined on the inner bearing ring 6 can be dimensioned to fully receive the protuberance on the ring 10. One of ordinary skill in the art would understand that a reverse configuration could be provided in which the ring 10 includes a recess instead of a protuberance, and the inner bearing ring 6 includes a protuberance instead of a recess. Various mating configurations or interfaces can be provided between the ring 10 and the inner bearing ring 6. During rotation of the bearing assembly, the first contact element 13 will repeatedly be driven in and out contact with the second contact element 6a, thereby generating vibrations, which promote the removal of debris from the seal assembly. In one example, the outer bearing ring 7 is rotationally fixed, and therefore the ring 10 is also rotationally fixed based on the engagement of the radially outer end 12 of the ring 10. In this example, the inner bearing ring 6 is rotating during use, and therefore the first contact element 13 on the ring 10 will be repeatedly driven inward and outward relative to the second contact element 6a on the inner bearing ring 6 during its rotation. One of ordinary skill in the art would understand that this configuration could be used in an alternative example in which the outer bearing ring 7 is rotating and the inner bearing ring 6 is rotationally fixed. In one configuration, the outer bearing ring 7 is rotating and the inner bearing ring 6 is rotationally fixed, however one of ordinary skill in the art would understand that this configuration can be reversed such that the inner bearing ring 6 rotates and the outer bearing ring 7 is rotationally fixed.

A first end 21 of the spring washer 20 can directly contact the ring 10 and a second end 22 of the spring washer 20 can directly contact the cap 30. Based on this configuration, vibrations can be transmitted through the ring 10 to the spring washer 20 and ultimately through to the cap 30. Vibrations can be imparted to the bearing assembly 9, for example, via rotation of at least one of the bearing rings 6, 7, and/or via the first and second contact elements 13, 6a repeatedly engaging with each other. These vibrations can provide a further protective feature based on the ring 10 vibrating, thereby promoting removal of debris from the cap 30. For example, if contaminants are building up on the outer axial side of the cap 30, then the vibrations can promote removal, shaking off, flinging off, etc., of these contaminants. Additionally, if the contaminants are building up on the ring 10, then the vibrations can promote removal of these contaminants.

The cap 30 can include a second end 32 extending axially inwards that partially defines a space (P) for the spring washer 20. The second end 32 of the cap 30 can have a slanted or angled profile, which both protects the spring washer 20 and also further prevents the ingress of any contamination. Vibrations from the ring 10 will also further promote removal of contaminants from the second end 32 of the cap 30 due to the slanted or angled profile of the second end 32. The cap 30 can be formed as a stamped sheet metal body with a coating to protect against rust. The profile of the cap 30 can vary.

The inner bearing ring 6 can include a shoulder 6b. The shoulder 6b can extend axially inward from an axially outermost face of the inner bearing ring 6. The shoulder 6b can include an axial extent 6c and a radial extent 6d. The axial extent 6c can be smooth and uninterrupted, while the radial extent 6d can include the second contact element 6a. One of ordinary skill in the art would understand that the profile of the shoulder 6b can vary.

Figure 3A:
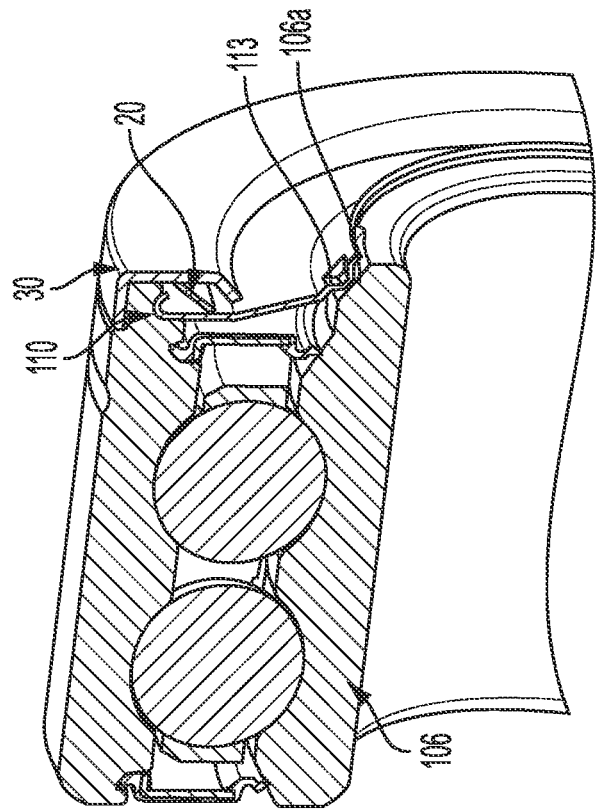
FIG. 3A is a cross-sectional view of another bearing assembly.
Figure 3B:
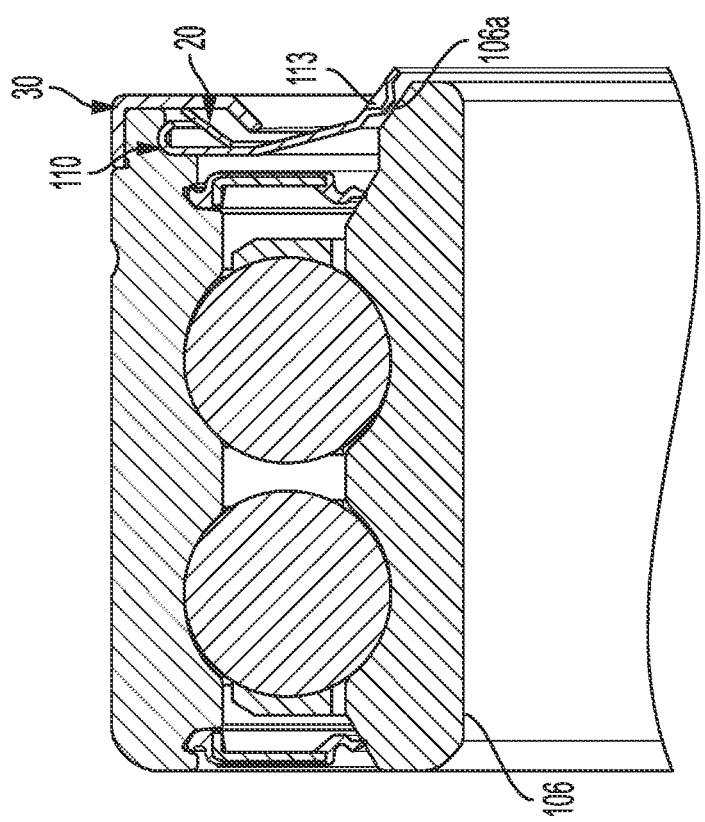
FIG. 3B is a perspective cross-sectional view of the bearing assembly of FIG. 3A.
Figure 3C:
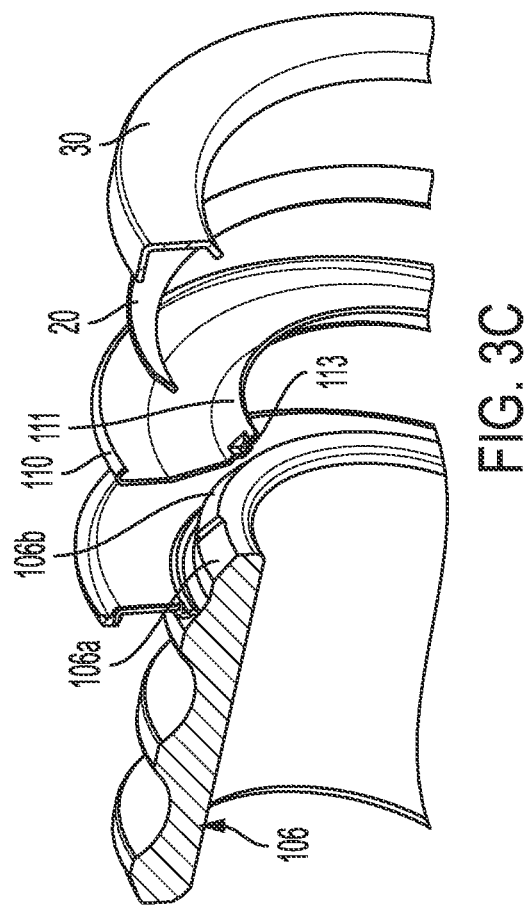
FIG. 3C is an exploded perspective cross-sectional view of the bearing assembly of FIGS. 3A and 3B.

In another example, as shown in FIGS. 3A-3C, the inner bearing ring 106 can include an angled face 106b, and the second contact element 106a can be formed on the angled face 106b. As shown in FIGS. 3A-3C, the ring 110 can also include an angled or slanted radially inner end 111 that includes the first contact element 113. One of ordinary skill in the art would understand that the profile and shape of the interface between the first and second contact elements can vary.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Wheel assembly 1
Bearing assembly 4
Sealing assemblies 5a, 5b
Inner bearing ring 6, 106
Second contact element 6a, 106a
Shoulder 6b
Axial extent 6c of shoulder
Radial extent 6d of shoulder
Outer bearing ring 7
Rolling elements 8a, 8a'
Cage 8b, 8b'
Sealing assembly 9
Ring 10, 110
Radially inner end 11, 111 of ring
Radially outer end 12 of ring
First contact element 13, 113
Curved portion 14 of ring
Spring washer 20
First end 21 of spring washer
Second end 22 of spring washer
Cap 30
First end 31 of cap
Second end 32 of cap
Angled face 106b

What is claimed is:

1. A seal assembly for a bearing assembly, the seal assembly comprising:
    a ring having a radially inner end configured to contact an inner bearing ring and a radially outer end configured to contact an outer bearing ring;
    a cap including a first end configured to attach to an outer bearing ring; and
    a spring washer arranged between the ring and the cap, wherein the spring washer applies a preload force to the ring.

2. The seal assembly according to claim 1, wherein the cap includes a second end extending axially inwards that partially defines a retention space (P) for the spring washer.

3. The seal assembly according to claim 1, wherein the ring is formed from stamped steel.

4. The seal assembly according to claim 3, wherein the ring is coated with polytetrafluoroethylene (PTFE) or graphite.

5. The seal assembly according to claim 1, wherein the radially inner end or the radially outer end of the ring has a curved portion, and the inner bearing ring or the outer bearing ring has a groove in which the curved portion is secured.

6. The seal assembly according to claim 1, wherein the ring includes a first contact element defined on the radially inner end or the radially outer end.

7. The seal assembly according to claim 6, wherein the first contact element of the ring is configured to repeatedly engage with a second contact element defined on the inner bearing ring or the outer bearing ring while the inner bearing ring or the outer bearing ring rotates, such that the ring generates a vibrational force.

8. The seal assembly according to claim 7, wherein the second contact element is formed as a recess on the inner bearing ring.

9. The seal assembly according to claim 8, wherein the inner bearing ring includes a shoulder and the second contact element is formed on a radial face of the shoulder.

10. The seal assembly according to claim 8, wherein the inner bearing ring includes an angled face, and the second contact element is formed on the angled face.

11. The seal assembly according to claim 6, wherein the first contact element is formed as a protuberance on the radially inner end of the ring.

12. The seal assembly according to claim 1, wherein the first end of the cap is configured to attach to a radially outer face of an outer bearing ring.

13. The seal assembly according to claim 12, wherein the first end of the cap is attached to the radially outer face of the outer bearing ring via an interference fit.

14. The seal assembly according to claim 1, wherein a first end of the spring washer directly contacts the ring and a second end of the spring washer directly contacts the cap.

15. A bearing assembly comprising:
    an inner bearing ring, an outer bearing ring, and at least one row of rolling elements supported between the inner bearing ring and the outer bearing ring; and a seal assembly comprising:
- a ring configured to contact the inner bearing ring and the outer bearing ring;
- a cap configured to attach to the outer bearing ring; and
- a spring washer arranged in a retention space (P) defined between the ring and the cap, wherein the spring washer is configured to press the ring axially inward relative to the inner bearing ring and the outer bearing ring.

16. The bearing assembly according to claim 15, wherein the ring includes a first contact element that is configured to repeatedly engage with a second contact element defined on the inner bearing ring during rotation of the inner bearing ring.

17. The bearing assembly according to claim 16, wherein the second contact element is defined on an angled face of the inner bearing ring.

18. The bearing assembly according to claim 15, further comprising an additional seal assembly arranged axially inward relative to the seal assembly.

19. The bearing assembly according to claim 15, wherein the inner bearing ring includes a shoulder with a radial extent defining a contact surface for the ring.

20. The bearing assembly according to claim 19, wherein the shoulder includes an axial extent and a radial extent, wherein the radial extent defines a contact element configured to engage with a contact element defined on the ring.

* * * * *